May 30, 1967        C. E. GODSHALK        3,321,847
BALANCE AID
Filed Aug. 4, 1964                                             3 Sheets-Sheet 1
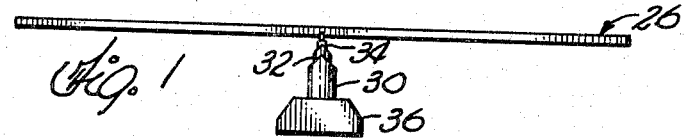
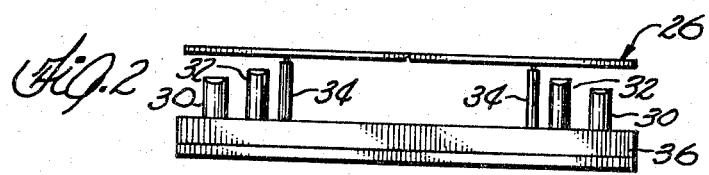
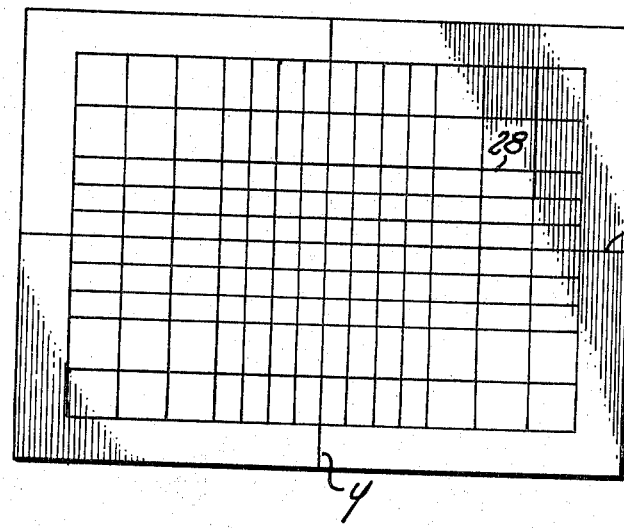
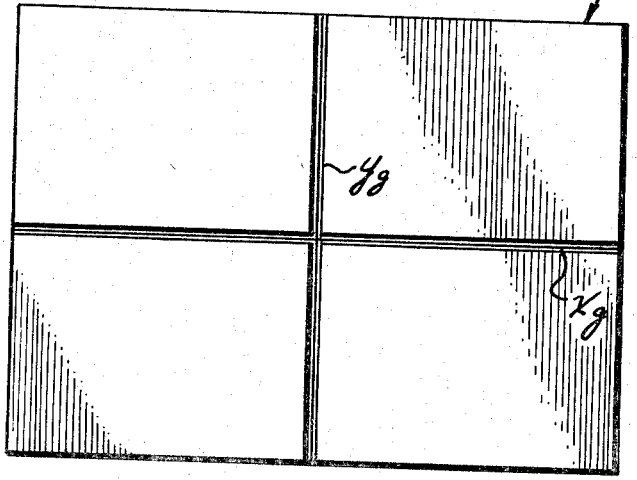

May 30, 1967      C. E. GODSHALK      3,321,847
BALANCE AID
Filed Aug. 4, 1964      3 Sheets-Sheet 2
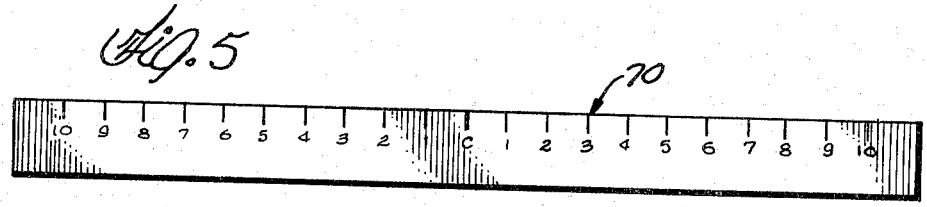
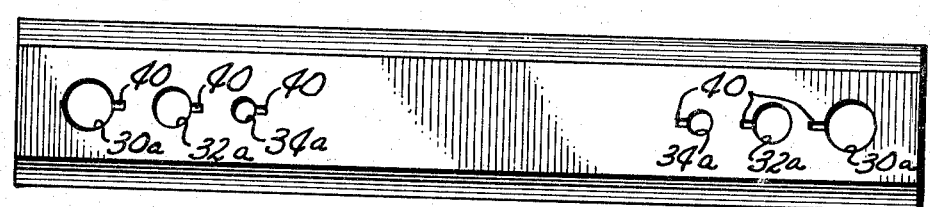
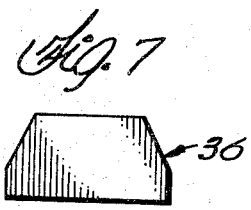
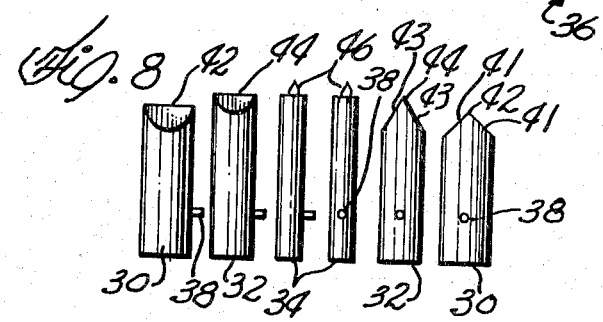
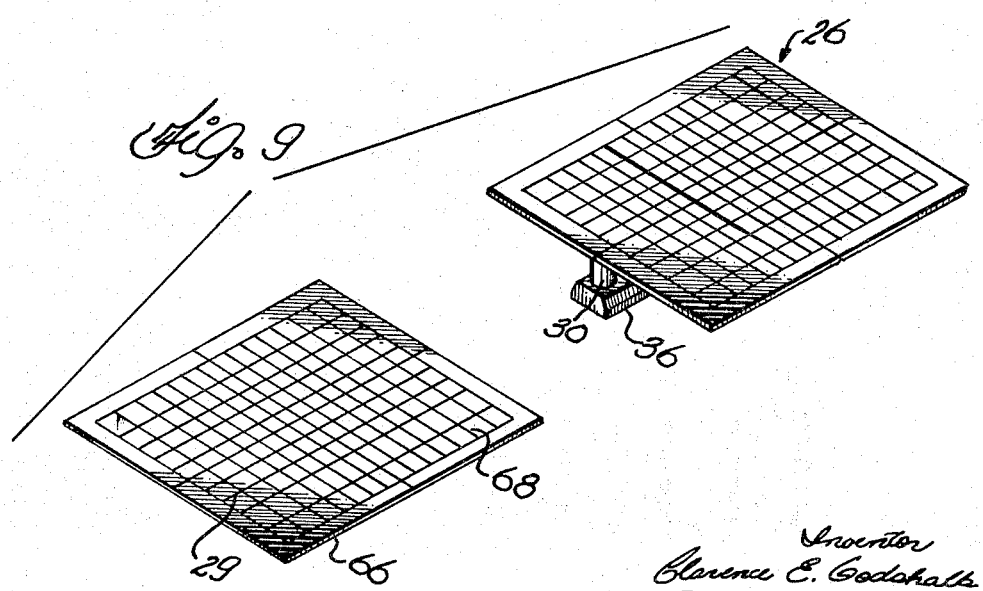

May 30, 1967     C. E. GODSHALK     3,321,847
BALANCE AID
Filed Aug. 4, 1964     3 Sheets-Sheet 3
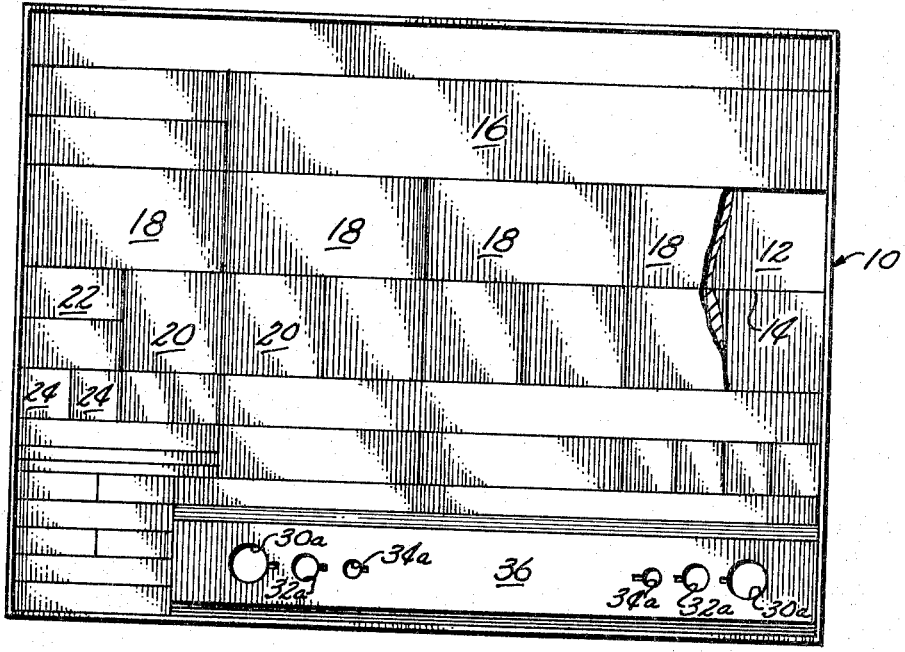
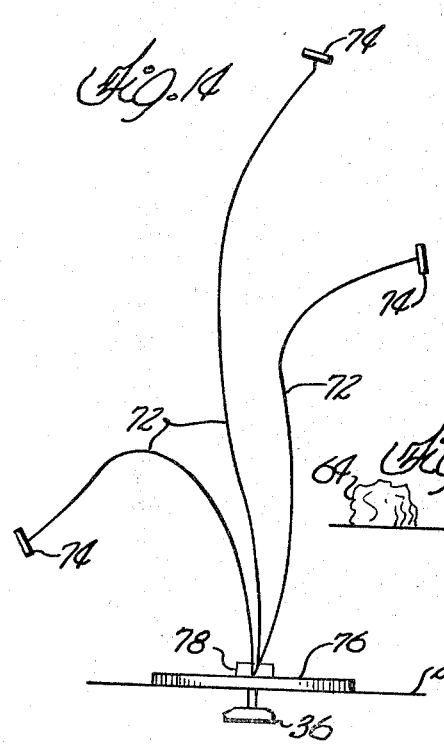
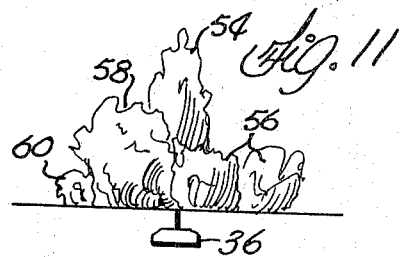
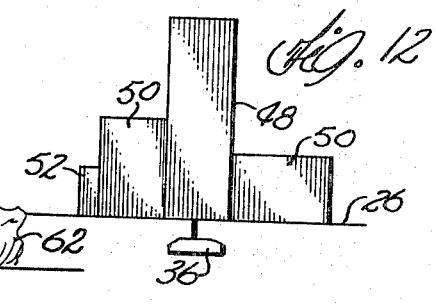
Inventor
Clarence E. Godshalk
By
Pendleton, Neuman,
Seibold & Williams
Attorneys

United States Patent Office 3,321,847
Patented May 30, 1967

3,321,847
BALANCE AID
Clarence E. Godshalk, 4S046 Evergreen,
Lisle, Ill. 60532
Filed Aug. 4, 1964, Ser. No. 387,363
20 Claims. (Cl. 35—1)

This invention relates to a method for training the eye to recognize visual balance, and more particularly relates to an aid which may be employed to train the eye to recognize and appreciate visual balance.

Inasmuch as to balance is to counterbalance one object against another, visual balance comprises the counterbalancing or comparison by eye of the surfaces of masses viewed from a focal balancing point disposed along a theoretical axis of visual balance. If the objects viewed from the focal balancing point give the impression of being stable or having all components in proper relation to each other, the objects are said to be in visual balance. Visual balance therefore relates to surfaces of masses viewed from a specific point and is not concerned with the density of the objects viewed or the actual weights of the objects.

The simplest form of visual balance comprises symmetric balance wherein a plurality of identical objects are uniformly disposed relative to a reference line or point. Thus, spaced twin vases placed on the mantel of a fireplace equal distances from the center line of the fireplace may be said to be in symmetric balance. Anyone who is able to measure distances fairly accurately by eye is capable of arranging objects in symmetric balance.

The more difficult type of balance is asymmetrical and may be found in all informal arrangements and groupings. Asymmetrical balance is achieved with masses of different sizes and shapes placed at distances which may or may not be equal from the balancing line or point. Thus, shrubs of varying size may be placed in asymmetrical balance relative to a door of a house, or a piece of statuary comprising the balancing point or point disposed on the axis of visual balance. Because of the non-uniform mass of the shrubs, uniform spacing thereof relative to the balancing line generally will not provide a pleasing appearance, i.e., the shrubs will not be in visual balance.

In accordance with this invention, objects may be readily placed in visual balance when viewed from a specific viewing point disposed along the axis of visual balance by employing the "principle of moments." The latter is a basic principle of physics relating to levers, involving a weight or force and its perpendicular distance from the fulcrum, the product of which is called the "moment of force." Thus, when a lever disposed on a fulcrum is balanced by weights on opposed sides of the fulcrum, or in equilibrium, the sum of the moments tending to turn it in one direction is equal to the sum of the moments tending to turn it in the opposite direction about the fulcrum.

Employing this basic principle of physics it has been found that objects may similarly be placed in visual balance relative to a viewing point. The latter point is disposed along the axis of visual balance which includes the fulcrum about which the objects are balanced. Visual balance is attained by arranging the objects relative to the visual axis of balance in the same manner as when the objects are placed in weight balance about a fulcrum with one important exception. The surface areas of the objects placed in visual balance are only those visible surface areas viewed from the viewing point or point of focalization disposed along the visual axis of balance, assuming that the viewed surface areas have a uniform density and depth. Thus, model units representing surface areas of the actual objects to be placed in visual balance will simultaneously be in visual balance when placed in weight balance on a balance board disposed on a fulcrum which is disposed along the visual axis of balance, as well as the axis of weight balance.

In order to place objects, such as objects of shrubbery in landscaping, or building units in architectural designing, in visual balance, corresponding scale models are first placed in visual balance on a pivoting balance board. Since visual balance is only concerned with balance to the eye, it is visible surfaces which are placed in balance when viewed from a specific viewing point. Therefore, the scale models are of uniform thickness and density and have the surfaces thereof in balance and arranged in non-overlapping relationship transversely to the balancing axis of the balance board on which disposed. Since the viewing point is in alignment with the balancing axis, the scale models will not only be in weight balance when the balance board is horizontal, but also in visual balance since the exposed surface areas will be disposed relative to the balance axis in the same manner as the weights thereof.

Once the desired relative disposition of exposed surfaces of scale models relative to a balance axis is known, the actual objects are then placed in a similar arrangement with respect to a point of focalization disposed on the axis of visual balance.

For carrying out the above method, a kit has been provided comprising a number of model units of uniform thickness and density which may be arranged on a balance board in the manner above described.

It is an object of this invention, therefore, to provide a method for placing objects in visual balance relative to a viewing point disposed on a theoretical axis of visual balance.

It is another object of this invention to provide a kit which is adapted to be employed in solving actual problems involving visual balance, and also is useful in training the eye to recognize visual balance and readily place objects in visual balance.

It is another object of this invention to provide a kit which may be employed as a game in the competitive testing of visual balance appreciation.

It is a further object of this invention to provide a method for placing objects in visual balance when viewed from a plurality of viewing points.

It is another object of this invention to provide a kit adapted to simultaneously place model units in visual balance and weight balance.

The above and other objects will become more apparent from the following disclosure when read in the light of the accompanying drawing and appended claims.

In utilizing one form of the kit of this invention, a balance board is placed in balance by supporting the same over spaced vertical pivots mounted on a support base. To facilitate balancing, a groove is formed along the central balancing axis thereof. Model units, such as wood blocks of uniform thickness and density and having various peripheral configurations, are then arranged on the balance board on opposed sides of the balance axis with the faces of the units arranged transversely to such axis and in non-overlapping relation. Uniform thicknesses of clay may also serve as model units. When the balance board is horizontally disposed with the model units in desired relationship, the model units are not only in weight balance but also in visual balance, as above explained. Actual objects corresponding in area ratio to the model units are then similarly arranged relative to an axis of visual balance along which a preferred viewing point is disposed.

The kit provided by this invention for carrying out the above method may employ markings on the balance plate upper surface to facilitate placing the plate in balance when model units are placed thereon. Also, pivots affording varying areas of contact with the balance board may be employed to vary the sensitivity of balance. An accuracy member having graduations thereon may be employed to determine in a quantitative manner the amount of unbalance of a board, as will hereinafter be explained in greater detail.

The basic principles hereinafter set forth are also readily adaptable to the determination of the balance axis of color intensity or color tone of a planar work of art such as a painting or of a black and white photograph. In ascertaining the balance axis of color intensity, a value based on a graduated scale is given to each unit area of the pictorial representation. Model units arranged to simulate the representation and having the same relative weights as corresponding color intensities are placed on a balance plate and moved as a unit, while arranged to simulate the color intensities of the pictorial representation, until the plate is balanced.

It is also an object of this invention, therefore, to provide a method for determining the axis of color intensity of a pictorial representation and a kit for carrying out such method.

For a more complete understanding of this invention, attention will now be given to the accompanying drawings wherein:

FIGURE 1 comprises a front elevational view of a balance plate mounted in balance on the tallest pair of pivot-points extending from a supporting base member, all of the foregoing elements comprising a portion of the kit constructed in accordance with this invention;

FIG. 2 is a side elevational view taken at right angles to FIG. 1;

FIG. 3 is an enlarged top plan view of the balance plate of FIGS. 1 and 2 illustrating markings disposed thereon which may be employed to facilitate positioning of model elements thereon:

FIG. is a bottom plan view of the plate of FIG. 3 illustrating intersecting grooves formed in the bottom surface thereof, said grooves being disposed along the intersecting central axes of the plate;

FIG. 5 comprises a scaled block adapted to rest along an edge of the balance plate illustrated in FIGS. 1 through 4 for purposes of indicating the degree of unbalance, if any, when elements are placed on the balance plate;

FIG. 6 is a top plan view of a support base for a balance plate;

FIG. 7 is an end elevational view of the base of FIG. 6;

FIG. 8 comprises an elevational view of the pivot members which may be employed for purposes of supporting the balance plate with various degrees of sensitivity;

FIG. 9 comprises a perspective view of a balance plate in position on supporting pivot members disposed adjacent a transfer plate adapted to transfer arranged model elements to the balance plate;

FIG. 10 is a top plan view partly broken away illustrating elements of a kit constructed in accordance with this invention disposed in a container;

FIG. 11 is a front elevational view illustrative of the manner in which the kit of this invention may be employed for determining the axis of visual balance of a grouping of shrubbery;

FIG. 12 is a front elevational view depicting model elements corresponding generally in surface configuration to the shrubbery of FIG. 11 for purposes of determining the axis of visual balance utilizing the kit provided by this invention;

FIG. 13 is a front elevational view similar to FIG. 11 illustrating the manner whereby the axis of visual balance may be determined for spaced shrubbery members employing the kit of this invention; and FIG. 14 is a front elevational view illustrating flower model members disposed in balance on a balance plate.

As above explained, the purpose of this invention is to teach a method for determining the axis of visual balance of various objects, such as shrubbery, statuary, building units, etc., when viewed from a specific viewing point or point of focalization disposed along such axis. In every form of art, there is always a point of focalization or a main point of interest whereas the eye of the viewer is attracted by the stability and proper relationship of the objects viewed. When a plurality of objects in visual balance are viewed, they combine to provide a pleasing appearance or effect a visual balance as the viewer views the same from a predetermined focal point.

Substantially every home owner is confronted with problems of visual balance in the arranging of shrubbery and flowers about his house and yard. In order to teach the individual how to determine in a ready manner the center line of visual balance of a plurality of separated objects or a plurality of grouped objects, a kit is provided composed of a number of model units of various sizes to enable the user of the kit to combine the various units of varying size into a large number of articles of desired configuration.

Visual balance kit

Such a kit is illustrated in FIG. 10 wherein a plurality of model units are illustrated disposed within a container 10. Because of the large number of units therein, the bottom 12 of container 10 has printed thereon an outline 14 of the various model units and other components of the kit which are to be disposed in proper relationship within the container 10 in order to make optimum use of the available container volume.

The varying size of the units found in container 10 is apparent from FIG. 10. Elongate member 16 is three times the size of units 18, which are, in turn, twice the size of units 20; units 20 are twice the size of units 22, which are twice the size of units 24.

Employed in combination with the various model units disposed in container 10 is a balance plate 26, more clearly seen in FIG. 3, which may have disposed on the top surface thereof reference lines 28 for purposes of facilitating arranging the model units thereon in balance relative to intersecting central axes X and Y. Formed on the bottom surface of the balance plate 26 directly beneath the central X and Y axes are grooves $X_g$ and $Y_g$. It is the function of the grooves to facilitate engagement with supporting pivots, such as pivots 30, 32 and 34 illustrated in FIG. 8. The latter pivots are adapted to be readily inserted in a supporting base 36 (see FIG. 6) having pivot-receiving apertures 30a, 32a and 34a.

It will be noted from FIG. 8 that each of the pivot members has a projecting pin 38 extending at right angles to the pivot longitudinal axis. It is the function of these pins 38 to rest in recesses 40 formed contiguously with main pivot openings 30a, 32a and 34a, as is apparent in FIGS. 6 and 10.

It will also be noted from FIG. 8 that the pins 38 are arranged parallel to the length of pivot edge 42 in pivot 30, and edge 44 in pivot 32. When the pivots 30 are inserted in the openings 30a of the base 36, each pivot edge 42 will be disposed in desired axial alignment with the corresponding edge of its twin pivot when pins 38 of the respective pivots are received in the recesses 40 formed in supporting base 36. Edges 44 of pivots 32 are similarly aligned when such pivots are inserted in base openings 32a. In addition, pins 38 provide a means for insuring that each pivot is inserted the desired distance into its corresponding opening in base 36 since the pins 38 also function as stops when received in recesses 40 formed in the base.

As seen from FIG. 8, the pivot edge 42 of pivot 30 is longer than pivot edge 44 of pivot 32 whereas the pivot areas provided by pivots 34 merely comprise points 46 which may comprise metal pieces extending from a wooden housing comprising the main body portion of the pivots 34.

It is also apparent from FIG. 8 that opposed inclined surfaces 43 of pivot 32 which meet at edge 44 define a lesser angle than do inclined surfaces 41 of pivot 30 which meet at edge 42.

Because of the latter variance in angularity of the edge-defining surfaces and because of the variance in available pivot area provided by the three pivots 30, 32 and 34, when such pivots are placed in interfitting engagement within a groove $Y_g$ or $X_g$ of the balance plate 26 of FIG. 4, the sensitivity of the balance plate 26 to an out-of-balance condition will become increasingly greater as pivot members of decreasing contact area are employed for purposes of supporting the plate. By employing a pair of pivots affording a certain area of contact with the groove of the balance plate, the resulting sensitivity of the balance plate to being out of balance may be controlled. Nails having different degrees of flatness at the points may be employed as pivots as suggested by pivots 34. Six penny nails may vary in sensitivity by having sharp points, points flattened to $\frac{1}{32}$ of an inch and flattened to $\frac{1}{16}$ of an inch. Only the upper $\frac{3}{16}$ inch or so of the nail need extend from a wooden housing to obviate injuries which might result from inadvertently stepping on the same while mounted in a base.

*Method of using kit for determining axis of visual balance*

In carrying out one method of this invention, balance plate 26 is placed in balance on a pair of any of the various pivots supplied in the kit to afford desired sensitivity. Balance plate 26 may be initially supported on pivots 30, as illustrated in FIG. 9, or initially balanced on the most sensitive pivots 34 in the manner illustrated in FIGS. 1 and 2. It is apparent from the latter two figures, as well as FIG. 8, that the more sensitive the pivots become, the greater their height. In progressing from the least sensitive pivots to the most sensitive pivots, the previously used pivots may remain in place on the base 36 and need not be removed as the next pivots in order of sensitivity are employed. Inasmuch as the balance grooves $Y_g$ and $X_g$ have been formed along the balance lines of the balance plate, the plate automatically balances into the horizontal position of FIG. 9 or FIG. 1 upon engagement with the pivots supporting the same.

Assuming that a user of the provided kit is attempting to find the axis of visual balance in shrubbery which he is desirous of grouping in the manner illustrated in FIG. 11, the user of the kit will select from container 10 the model units which most closely resemble the appearance of the shrubbery grouping when viewed from a desired location to be disposed along the axis of visual balance.

It will be seen from FIG. 12 that the continuous surface defined by the blocks or model units 48, 50 and 52 conforms substantially with the visual surface area defined by the separate shrubs 54, 56, 58 and 60. Therefore, by placing the corresponding model units 48, 50 and 52 on a balance plate 26, so as to be in balance, the resulting weight balance will also provide the axis or line of visual balance. This is so since the surface area defined by the blocks or model units 48, 50 and 52 is defined by model units of uniform density in the visual expanse which they provide.

The latter principle is extremely important in utilizing the kit of this invention. It will be noted from FIG. 11 that the shrubs illustrated overlap to a certain extent. Thus, shrubs 56 and 58 overlap shrub 54, and shrub 60 overlaps a portion of shrub 58. Consequently, if model units were arranged in the overlapping relationship of the shrubs, as seen in FIG. 11, a weight balance could be attained which would not reveal the desired axis of visual balance. The overlapping portions of the model units would prevent the determination of the true axis of visual balance of the exposed surface areas defined by the blocks.

In utilizing the blocks of the provided kit, the surface areas defined by the model units must be represented by units providing a uniform surface area per unit weight. The desired axis of visual balance will then be in axial alignment with the supporting pivot points for the balance plate, or normal to the plane of the surface area defined by the model units. It is apparent from the weight balance axis of FIG. 12, which is also coincident with the axis of visual balance, that the axis of visual balance for the shrubbery grouping of FIG. 11, will be on a line substantially normal to the central vertical axis of the shrub member 54 of the grouping illustrated in FIG. 11.

It is seen from the foregoing description that in the method for using the provided kit for ascertaining the axis of visual balance, the model units when employed should not overlap and, accordingly, the units should provide a uniform surface area per unit weight. This may most readily be assured by forming the model units of uniform thickness and of a material of composition having a uniform density. The units in container 10 of FIG. 10 may be formed of plastic or knot-free redwood blocks of uniform thickness, thereby assuring that each unit surface area defined by the various model units when arranged transversely to the pivot plate axis of balance, as illustrated in FIG. 12, is represented by a uniform weight. As previously pointed out, clay of uniform thickness and density may also serve as model units; clay possesses the advantage of being readily cut to desired configuration. The clay employed should, of course, possess the requisite stiffness for positioning on the balance plate. Employing the model units in the manner above described and arranging the same in weight balance automatically results in the arrangement of the axis of visual balance of the block groupings along the axis of balance of the balance plate.

The foregoing discussion of FIGS. 11 and 12 illustrates the manner whereby a landscaper having a number of shrubs arranged in a desired grouping relative to each other may ascertain a manner in which he should place the grouping so that the axis of visual balance is desirably located relative to a viewing point.

It is, of course, also possible to utilize the provided kit for purposes of determining the axis of visual balance for spaced objects of dissimilar shape and size utilizing the well-known principle of moments. Thus, referring to FIG. 13, shrub 62 is illustrated in spaced relationship with shrub 64. It will be noted that the exposed surface of shrub 62 is approximately twice that of shrub 64. Assuming the two shrubs are to be located relative to a path or doorway, or in desired relationship with respect to some other specific viewing point, the axis of visual balance along which the viewing point is disposed may be determined by placing model units representative of two surface areas defined by the shrubs 62 and 64 on a balance plate.

Since the weight of the model units will be in proportion to the surface area disposed transversely to the balance axis, shrub 64 will be disposed at a distance relative to the balance axis which is twice that of the distance at which shrub 62 is disposed relative to the balance axis. This must necessarily follow since the moment of the force created by the weight of the block representing shrub 62, in order to balance the moment created by the block representative of shrub 64, must be disposed at a distance relative to the balance axis which is one-half posed a sheet of paper 68 having reference lines 29 disposed thereon to facilitate location of the units placed that of the distance of the block representative of shrub 64 relative to the balance axis.

The provided kit can be utilized to ascertain the axis of visual balance of various objects which may be grouped or spaced, and asymmetrical or symmetrical in configuration and arrangement.

*Use of kit as a teaching aid*

The provided kit may also comprise a teaching aid for purposes of training the eye to rapidly arrange objects of varying configuration so that they are disposed in desired relationship relative to a visual line of balance. To conduct such training exercises, the balance plate 26, supporting pivots, and base are employed in the manner previously described in combination with a transfer plate, such as plate 66 illustrated in FIG. 9. In the course of carrying out the training exercise, students will place model blocks on the transfer plate 66, atop which is disthereon relative to the central intersecting axes.

After the student has arranged the model units in the manner whereby he believes that the arrangement has been made in such manner that the model units are in visual balance, the sheet of paper 68 may be slid from the transfer plate 66 to the upper surface of the balance plate 26. Being of the same size, sheet 68 is superimposed over the surface area of plate 26. If the student has arranged the model units in true visual balance, the balance plate 26 will remain horizontally balanced after the sheet 68 has been placed thereon with the objects. If, however, the balance plate is thrown out of balance, it is obvious that the model units arranged by the student are not in weight balance and, therefore, not in visual balance relative to the axis of weight balance.

In order to determine the degree of out-of-balance, a scaled elongate block, such as block 70, in FIG. 5, may be disposed along an edge of the balance plate transversely disposed to the weight-balance axis of the plate. The sheet transferred to the balance plate 26 may then be moved a predetermined number of units to the right or the left, as indicated by the scaled block 70. The latter movement is a quantitative indication of the degree of out-of-balance which the model units placed on the balance plate were in. As an alternative method for placing the balance plate in balance, block 70 itself may be moved to the right or left relative to the central balance axis and the number of units moved relative to the weight balance axis of the plate will indicate the degree of out-of-balance. Measuring indicia extending from the central balance axis of the balance plate may also be formed along the edges of the balance plate itself to indicate degree of out-of-balance. Also, an indicator needle depending at right angles from the center of the balance plate overlying the balance axis may pivot over a calibrated dial which may be attached to the pivot base to indicate the amount of out-of-balance.

Use of kit as a game

The provided kit is readily adaptable to use as a game in which a single player plays "solitaire" as perfect or improved visual balance is sought with various arrangements. The kit also lends itself to competitive use between teams. Opposing players may individually place objects in what is believed to be visual balance on a sheet placed on a transfer plate. The arrangements are then transferred to a balance plate and the team having the lesser total amount of out-of-balance units, as may be determined by means such as block 70 of FIG. 5, is declared the winner.

Teams of two, or more, may cooperate in placing objects in visual balance in competition with other teams. The kit may thus be employed in a game in which skill and not chance is of primary importance. The game provides a challenge to the skill of the player while encouraging cooperative effort, thereby functioning as a desirable medium for introducing individuals at a party.

Method of arranging objects in visual balance along a plurality of axes

Assuming that an arrangement of objects is to be viewed from more than one viewing point, it may be desirable to have objects in visual balance when viewed along two separate axes of visual balance. Thus, model units representative of sculptured objects, shrubbery, or the like, may be balanced on the balance plate with the supporting pivots in groove $X_g$, after which the balance plate is removed and turned 90 degrees so as to be balanced along the axis $Y_g$. When the balance plate balances in horizontal position along both axes, the objects will be in visual balance when viewed at 90 degree intervals corresponding to opposed ends of the X and Y axes of the balance plate.

Inasmuch as such objects would normally be objects adapted to be viewed 360 degrees about the entire exterior, such as a piece of sculpture in the round, the model units are preferably cylindrical and would not be arranged transversely to balance axes.

Use of kit to study flower arranging

The provided kit of this invention may also be employed to study flower arranging by employing wires 72 illustrated in FIG. 14, which may be representative of flower stems or flower holders having disposed on the ends thereof apertured blocks or pegs 74 which frictionally engage the terminal ends of the wires 72. The wires extend from a supporting base 76 which may have a block of clay 78 disposed thereon for purposes of supportably engaging the lower end limits of the wires 72. It is apparent that when the plate, clay, wire, and block assemblage is in weight balance on the balance plate 26, the arrangement representative of a flower arrangement will also be in visual balance. However, to assure visual balance, the same principles above stated must be adhered to, namely, all wires in one arrangement should be of the same size and material, and the model portions representing the flower blooms should be of uniform density.

It should be appreciated that the wire-supporting clay, or if desired apertured wood block, 78 of FIG. 14 need not be centrally disposed on base 76. Flowers may be in visual balance without necessarily having the stems thereof extending from a point coincident with the axis of visual balance. However, in those arrangements wherein the stems extend from a base offset from the axis of visual and weight balance, a weight must be disposed on the opposite side of the balance axis to exactly offset the weight of the base. The stems and flower units are then arranged to extend on opposite sides of the balance axis until the entire assembly is in weight and visual balance on the balance plate.

Balance axis of color or color tone intensity

The above discussed principles are broadly applicable to the teaching of one phase of line drawings, paintings and photography. Black and white intensity, or color or color tone intensity of a painting, photograph or other planar work of art may be analyzed utilizing the principle of moments. This is accomplished by assigning a numerical value to intensity of darkness in a black and white photograph, or to color intensity in a painting employing a plurality of colors or color tones.

However, unlike the procedures above described in ascertaining the axis of visual balance, the various color or color tone intensities will possess a weight per unit area represented in the main viewing plane which is in direct proportion to its intensity. The color or color tone intensity may be represented by model units having uniform densities by varying depths transverse to the viewing plane providing weights for the surface areas represented by the main faces in the viewing plane which are proportional to the color or color tone intensities. The model units may also be composed of materials of varying density enabling their thickness in the viewing plane to be uniform.

By way of example, shades of white to black may be assigned values from zero to ten. A black and white photograph may be represented by model blocks of varying densities in the viewing plane which densities correspond to the intensities of black in the actual photograph represented thereby. The blocks corresponding to those illustrated in the various figures of the drawing, but varying in density with the color intensity of the surface area represented, are arranged on a balance plate such as plate 26.

The plate will be in weight balance about a color intensity axis of balance, which corresponds to the weight axis of balance, when the quantity of black intensity on one side of the balance axis equals the intensity disposed on the other side. The surface area defined by the model units is disposed either in a vertical plane transverse to the balance axis or flat on the balance plate surface on opposed sides of the balance axis of the plate. Clay which may be readily cut to conform with the configuration of areas of a photograph or picture to be represented especially lends itself to use in the determination of the balance axis of color intensity.

The same procedure is followed in analyzing a painting having a plurality of colors or color tones wherein each unit area of color or color tone is assigned a value dependent upon its intensity based on any desired scale as from zero to ten, or zero to one hundred. Upon placing the model units having a weight per unit area corresponding to the color or color tone intensity in a viewing plane intersected by the balance axis, the units will be in balance with respect to an axis of color or color tone intensity when the units are placed in weight balance. Line drawings may be represented on a balance plate by wires corresponding in size and density to the size and color intensity of the lines of the actual drawing.

Students are thus able to employ model units corresponding in size but unlike in density to those of the previously described kit for purposes of ascertaining the axis of color, color tone, or blackness intensity in a color, color tone, or black and white picture, respectively. Analyses of known works of art will enable students to similarly place color or color tone intensities in paintings of their own. Thus, arrangement of color or color tone intensities for various color combinations may be determined for various subject matter commonly painted by analyzing known works of art, and similar locations made in original paintings of similar subject matter. The techniques of known masters may thus be analyzed more closely and the feature of color or color tone intensity balance may be simulated after an analysis.

It is seen from the foregoing that methods have been provided for ascertaining the lines of visual and color intensity balance of various objects regardless of shape and size. The methods employ representative model units which, when properly placed in weight balance, automatically provide an arrangement of the objects in desired balance. The placement of the objects in visual balance is accomplished by placing in weight balance the surface areas of objects arranged transversely to a balance axis. Each unit surface area of the model units placed in weight balance for purposes of determining visual balance must be of uniform density and in non-overlapping relationship with any other unit of surface area represented.

Units placed in color or color tone intensity balance vary in weight per unit area of surface defined thereby. The variance in weight may be effected by employing model units of varying density or model units of uniform density but varying thickness as above explained. Also, model units of uniform density and thickness may vary in weight by differing in the thicknesses of paint coatings which are placed thereon. Since it is the relative difference in weight between the units which is of importance rather than the total weights, a model unit representing an intensity nine times as great as another unit may have a paint coating thereon nine times as great as such other unit. The differences in model unit weight effected by coverings of paint will obviously work to advantage only when the balance plate is extremely sensitive to an out-of-balance condition. When employing the paint coats for providing weight differentials between model units, the final color of the outermost layer may provide a key as to the relative weight represented thereby.

The specific materials of composition for kit units above described are not of critical importance. The balance plate may be of any composition, such as plastic, wood, or fiberboard, which is shape-retaining and not subject to deterioration or moisture absorption so that the density of the same will not vary. The material of composition should, of course, be uniform throughout so that the plate has a uniform weight per unit area. As above indicated, the model units to be employed should be of uniform weight per unit surface area represented when employed for determining visual balance. This is most easily accomplished by employing units fabricated of a material of composition of uniform density, the units being of uniform thickness. Model units of varying density may be used in ascertaining visual balance, but as a result, the thicknesses of the various units must be varied so that the unit surface area represented by the units will still be uniform per unit weight of the units.

It is believed apparent from the foregoing description that various changes may be made of the various components. For example, the specific means for placing the balance plate in balance is not of critical importance. Thus, as a replacement for the illustrated supporting pivot members, various equivalent bottom or overhead supports functioning similarly to those illustrated and engaging central edge portions of the balance plate will function to equal advantage. Although merely basic rectilinear shapes have been provided as illustrative of the model units to be employed in the knit, it is apparent that an infinite variety of model unit shapes may be employed to more closely adhere to the actual configuration of the actual object to be placed in visual balance. The above-described method and the above-described kit for determining the axis of visual balance may be employed in any field where visual balance is desired, as in architectural designing, landscaping, and various fields of engineering. The method and kit for determining the balance axis of color intensity is of particular importance in the teaching of art.

Without further elaboration, the foregoing will so fully explain the character of my invention that others may by applying current knowledge, readily adapt the same for use under varying conditions of service, while retaining certain features which may properly be said to constitute the essential items of novelty involved, which items are intended to be defined and secured to me by the following claims.

I claim:

1. A kit for training the eye to appreciate balance in viewed objects, comprising model units adapted to provide surface areas of varying configuration in a single viewing plane, said model units having a predetermined weight per unit of surface area represented in said viewing plane; flat unobstructed plate means for balancing a plurality of model units in the horizontal plane at any point about a balance axis while said units provide surface areas of varying configuration in said single viewing plane; and pivot means for supporting said plate means while in a balanced positioned engaging portions of said plate means coincident with said balance axis, said pivot means having a predetermined degree of sensitivity to an out-of-balance condition of said plate means.

2. A kit for use in teaching visual balance comprising a flat unobstructed balance plate pivotally movable about a balance axis, means engageable with said balance plate for enabling said plate to balance about the balance axis thereof, forms of varying configuration and uniform density and thickness adapted to be arranged in balance on said plate about said balance axis, and non-obstructive means disposed on said balance plate for assisting the arrangement of said forms on said balance plate whereby said plate may be readily placed in balance.

3. The kit of claim 2 in combination with means to be disposed on a balance plate for placing an out-of-balance plate in balance and quantitatively indicating the amount of such unbalance.

4. The kit of claim 3 in which said means for placing an out-of-balance plate in balance comprises an elongate member of uniform density and cross section having a longitudinal center marking and graduations thereon extending in opposite directions from said center marking; said latter means being adapted to be positionable on said balance plate at right angles to said balance axis with said center marking disposed over said axis.

5. A method for placing objects in visual balance relative to an axis of visual balance comprising representing each of said objects by means of members providing a uniform unit of surface area per unit weight, said members having surface areas in substantially the same ratios as said objects when said objects are viewed from a viewing point disposed along said axis of visual balance; placing said members on a balance plate pivotally movable about a plate balance line with the areas thereof representing said objects disposed at substantially right angles to said balance line, placing said members in desired arrangement about said balance line with said members in weight balance, and arranging said objects in corresponding relation about said object axis of visual balance.

6. A method for placing objects in visual balance when viewed along two axes of visual balance a predetermined number of degrees apart, comprising forming model units having surface areas corresponding in a predetermined ratio to the surface areas of said objects when viewed along said two axes of visual balance and having a predetermined weight per unit of surface area in the viewing plane, arranging said model units in weight balance on a balance plate on opposite sides of one plate balance axis; arranging said model units in weight balance on said balance plate on opposite sides of a second plate balance axis, which is the predetermined number of degrees apart from said first balance axis as is disposed between said two axes of visual balance; rearranging said model units relative to said balance axes until said units are in weight balance relative to both of said weight balance axes, and arranging said objects in the same positions relative to said two axes of visual balance as said model units bear to said two balance axes when placed in weight balance.

7. A method for placing asymmetrically arranged objects of varying size in visual balance relative to a viewing point disposed along an axis of visual balance for said objects, comprising forming model units corresponding in a predetermined ratio to the surface areas of said objects when viewed from said viewing point; arranging said model units in weight balance on a balance plate having a balance axis on opposite sides of the plate balance axis; the surface areas defined by said model units having a uniform weight per unit of exposed surface area and being arranged at substantially right angles to said plate balance axis; and placing said objects in corresponding relationship about the object axis of visual balance.

8. A kit for training the eye to place floral arrangements in visual balance along a viewing axis, comprising balance plate means adapted to be placed in a state of balance in a horizontal plane about a balance axis, means engageable with said balance plate for enabling said plate to balance about the balance axis thereof, model units of uniform density representative of flower stems extending from the plate means, and model units of uniform density representative of flower blooms engaging the terminal ends of the stem model units; said plate means being adapted to be placed in balance with said model units thereon in non-overlapping relationship when all of said model units are viewed along an axis coincident with the axis of balance of said balance plate means.

9. A kit for training the eye to appreciate visual balance, comprising model units adapted to provide surface areas of varying configuration in one plane, said model units having a uniform weight per unit of surface area disposed in said one plane; plate means for balancing a plurality of model units in the horizontal plane, a plurality of pivot means for supporting said plate means in a balanced position, each one of said plurality of pivot means having a different degree of sensitivity to an out-of-balance condition of said plate means, and means positionable along an edge of said plate means for quantitatively indicating the degree of out-of-balance of said plate means when in an out-of-balance condition.

10. The kit of claim 9 in which said model units comprise readily moldable clay of uniform density.

11. The kit of claim 9 in which said model units comprise knot-free wood blocks of uniform density.

12. The kit of claim 9 in which said model units are fabricated of plastic of uniform density.

13. In a method for training the eye to appreciate visual balance of spaced objects, the steps comprising arranging model units in apparent weight balance on a calibrated transfer surface; said model units having main shape-defining surfaces of uniform weight per unit of surface area defined; said model units being arranged on opposed sides of a central balance axis of said transfer surface with the main shape-defining surfaces of said units disposed substantially transversely thereto, and placing said transfer surface, without altering the arrangement of the model units thereon, on a calibrated balance plate balanced about a balance axis, with the balance axis of said transfer surface superposed over the balance axis of said balance plate.

14. The method of claim 13 including the step of ascertaining the amount of resulting out of balance, if any, of said balance plate by moving a linearly calibrated movable block of uniform cross section along an edge of said balance plate disposed transversely to said balance axis until said balance plate is balanced in the horizontal plane and comparing the relative position of the block calibration to the central balance axis.

15. The method of claim 13 including the step of ascertaining the amount of resulting out of balance, if any, of said calibrated balance plate by moving said calibrated transfer surface relative to said balance plate until said balance plate is placed in balance and comparing the relative positions of the balance plate and transfer surface calibrations.

16. A kit for use in teaching color and color tone intensity distribution in a planar pictorial representation comprising a balance plate pivotally movable about a balance axis, surface-defining forms of varying configuration and varying weight per unit of surface area defined thereby, corresponding in weight to the color and color tone intensity of said pictorial representation defined thereby and adapted to be arranged in balance on said plate about said balance axis, and means engaging said balance plate for enabling said balance plate to be placed in balance and sensitive to a predetermined degree to an out-of-balance condition.

17. A method for ascertaining the axis of color and color tone intensity balance in a planar pictorial representation comprising assigning a color and color tone intensity value to each unit area of said pictorial representation; arranging model units representative of said pictorial representation, having a variance in weight per unit area of the surfaces defined thereby which corresponds to the relative color and color tone intensities in said pictorial representation represented thereby, on a balance plate adapted to be placed in weight balance about a balance axis; said model units defining a planar surface and having the same relative position therein on said balance plate as the color and color tone intensities represented thereby in said pictorial representation; and arranging said planar surface on said balance plate until said balance plate balances.

18. A method of claim 17 in which the colors of such planar pictorial representation comprise various intensities of black.

19. A method for ascertaining the axis of color and color tone intensity balance in a line drawing, comprising arranging wires corresponding in relative disposition, size and density to the relative disposition, size and color intensity respectively of the lines of such line drawing on a balance plate adapted to be placed in weight balance about a balance axis, and moving said wires while maintained in said relative disposition so as to balance on said balance plate.

20. A kit for training the eye to appreciate visual balance, comprising model units adapted to provide surface areas of varying configuration in one plane, said model units having a uniform weight per unit of surface area disposed in said one plane; plate means for balancing a plurality of model units in the horizontal plane, a plurality of pivot means for supporting said plate means in a balanced position, each one of said pivot means having opposed surfaces at an angle to each other and terminating in a pivot edge, the angularity of the opposed surfaces of each pivot means differing from the angularity of the opposed surfaces of every other pivot means to provide varying degrees of sensitivity to an out-of-balance condition of said plate means, and means positionable along an edge of said plate means for quantitatively indicating the degree of out-of-balance of said plate means when in an out-of-balance condition.

References Cited

UNITED STATES PATENTS

| | | | |
|---|---|---|---|
| 336,546 | 2/1886 | Becker | 177—191 |
| 2,305,567 | 12/1942 | Bole | 35—16 |
| 2,325,488 | 7/1943 | Donovan | 35—31.4 |
| 2,393,162 | 1/1946 | Hayes | 35—24.6 |

EUGENE R. CAPOZIO, *Primary Examiner.*

R. E. KLEIN, *Assistant Examiner.*

UNITED STATES PATENT OFFICE
CERTIFICATE OF CORRECTION

Patent No. 3,321,847                                                     May 30, 1967

Clarence E. Godshalk

It is hereby certified that error appears in the above numbered patent requiring correction and that the said Letters Patent should read as corrected below.

Column 3, line 38, after "FIG." insert -- 4 --; column 4, line 5, for "whereas" read -- whereat --; line 24, for "contatiner" read -- container --; column 6, lines 63 and 64, strike out "posed a sheet of paper 68 having reference lines 29 disposed thereon to facilitate location of the units placed" and insert the same after "dis-" in column 7, line 7; column 8, line 60, for "by" read -- but --; column 10, line 27, for "knit" read -- kit --.

Signed and sealed this 28th day of November 1967.

(SEAL)
Attest:

Edward M. Fletcher, Jr.                                   EDWARD J. BRENNER
Attesting Officer                                                  Commissioner of Patents